Nov. 5, 1974  F. S. DEATH ET AL  3,846,119

METHOD OF MELTING METALS WITH FLAMES

Original Filed Dec. 17, 1968

INVENTORS
FRANK S. DEATH
ANDREW G. SZEKELY
BY Lawrence H. Kastriner
ATTORNEY

United States Patent Office 3,846,119
Patented Nov. 5, 1974

3,846,119
METHOD OF MELTING METALS WITH FLAMES
Frank S. Death and Andrew G. Szekely, Scotch Plains, N.J., assignors to Union Carbide Corporation, New York, N.Y.
Continuation of abandoned application Ser. No. 784,334, Dec. 17, 1968. This application May 26, 1971, Ser. No. 147,227
Int. Cl. C21b 1/00
U.S. Cl. 75—43          10 Claims

ABSTRACT OF THE DISCLOSURE

A method of melting metal which provides a high rate of heat transfer between the flame and the metal without causing excessive oxidation of the metal. The method consists of forming a mixture of a fuel and a solid powdered additive, combusting the fuel-additive mixture with oxygen to obtain a flame and to cause the additive to become a molten product of combustion within the flame, and melting the metal by impinging the flame containing the molten product of combustion against the metal surface. Suitable additives include the metals, alloys, oxides, carbides and silicides of Ca, Mg, Ce, B, Al, Si, Cr, Mo, Fe, Ni, Ti, Zr, V and Mn.

This application is a continuation of application Ser. No. 784,334, filed Dec. 17, 1968, now abandoned.

BACKGROUND OF THE INVENTION

The present invention relates to a method of melting metals, and more particularly to a method of melting metals by direct exposure to an impinging flame.

There has long been a need in the metals industry for a method of melting metals by flames at a high rate, and at high heat transfer efficiency, without excessive oxidation of the metal. Steel can be produced in an open hearth furnace at moderate rates from practically any proportion of solid scrap and molten blast furnace iron. However, the freedom of charge composition available in the open hearth furnace is seriously limited in the high production rate basic oxygen furnace process because the energy supplied by the molten blast furnace iron is sufficient to permit processing only about 30 weight percent solid scrap in the furnace charge. There is considerable interest therefore in a method which makes it possible to utilize a greater percentage of scrap in the basic oxygen furnace. Such a method must provide good heat transfer between flame and scrap, allow safe tapping of molten blast furnace iron on the partially or completely melted scrap and must not excessively prolong overall processing time.

According to one conventional method, the flame from a fuel-oxygen burner is directed in the furnace against solid steel scrap to preheat and partially melt it. One difficulty associated with such a method is that at high firing rates the flame causes excessive oxidation of the metal at all practical fuel/oxygen ratios. Excessive oxidation will result in dangerously violent reactions when hot metal is contacted with the oxidized scrap. Furthermore, excessive scrap oxidation by a conventional flame causes too much iron oxide to migrate into the slag. In addition, excessive oxidation of the scrap causes the loss of metal resulting in a lower yield of metal.

When scrap is melted by direct exposure to flames, less iron is oxidized with fuel rich flames than with stoichiometric flames. That is, less iron is oxidized when the fuel is combusted with an amount of oxygen which is less than that required for a stoichiometric combustion. However, while iron oxidation is less when melting with fuel rich flames, this method is not practical, since the heating value of the fuel is not completely utilized, the heat transfer efficiency is low due to the low flame temperature, and the volume of the combustion gas is large compared to the heat utilized in the process.

The main disadvantage of low heat transfer efficiency between the flame and the metal is a low heating and melting rate. This prolongs the time of heat treatment, and also results in higher heat losses. Also, the hot combustion gases may overheat the furnace refractories, particularly in a vertical type furnace, such as the basic oxygen furnace, and can seriously damage the hood and other superstructures of the furnace.

OBJECTS

It is an object of this invention to provide a method for melting metal by direct exposure of the metal to a flame, which provides a high rate of heat transfer between the flame and the metal. It is another object of this invention to provide a method for melting metal by direct exposure of the metal to a flame, which provides a high heating and melting rate. It is still another object of this invention to provide a method of heating and melting metals which provides both a high heating and melting rate and a low rate of metal oxidation.

SUMMARY OF THE INVENTION

These and other objects, which will become apparent from the detailed disclosure and claims to follow, are achieved by the present invention which provides a method of melting metal with an oxy-fuel flame wherein the improvement comprises increasing the melting rate of the metal while simultaneously preventing excessive oxidation of the metal by the steps of:

(1) Providing a mixture of a fuel and a solid powdered additive selected from the group consisting of the metals, alloys, oxides, carbides, and silicides of calcium, magnesium, cesium, boron, aluminum, silicon, chromium, molybdenum, iron, nickel, titanium, zirconium, vanadium and manganese, (2) Combusting said fuel-additive mixture with oxygen to obtain a flame, and to cause said additive to become a molten product of combustion within said flame, and (3) Melting said metal by impinging said flame containing the molten product of combustion against the surface of the metal.

The oxy-fuel flame can be produced by the combustion of any conventional liquid or gaseous hydrocarbon fuel, such as methane, natural gas, kerosene or fuel oil fuel with an oxygen bearing gas such as air; preferably, however, commercially pure oxygen is used. Liquid fuels are preferred due to the ease with which particulate solid additives can be mixed with, and transported by such a fuel. Specific examples of suitable powdered solid additives are: Fe, Al, CaO, $CaC_2$, SiC, CaSi, FeSi, $FeO_3$ and $Cr_2O_3$. The selection of the additive is based on economy and on the chemical compatibility of the additive with the metallurgical process. In addition, the additive can be selected in such a way that the molten product of combustion of the additive will supply the alloying elements or fluxes, in part or in total, needed in the metallurgical process.

The methods of the present invention may be used to melt any metal, however, it is particularly applicable to metals which tend to oxidize readily such as the ferrous metals and alloys, aluminum and copper.

It is to be understood that as usual herein the term "molten product of combustion" is intended to mean a fully or partially melted additive as present in a flame, irrespective of whether melting is promoted by the heat of combustion of a conventional fuel or by the heat of combustion of the additive mixed with the conventional fuel. It is also to be understood that the term "oxygen" is intended to mean any oxygen containing gas, such as pure oxygen or air.

Furthermore, it is to be understood that while the specification and claims speak of "melting" metal, the method of the present invention can be utilized for heating or preheating metal by limiting the exposure time of the impinging flame upon the metal to less than that required to melt it.

Throughout the present specification and claims all percentages are weight percent unless specified otherwise.

The invention can be practiced in any vessel suitable for melting metals, as in horizontal furnaces, such as the open hearth furnace, or in vertical furnaces such as the basic oxygen furnace or shaft type furnace.

THE DRAWINGS

Figure 1:
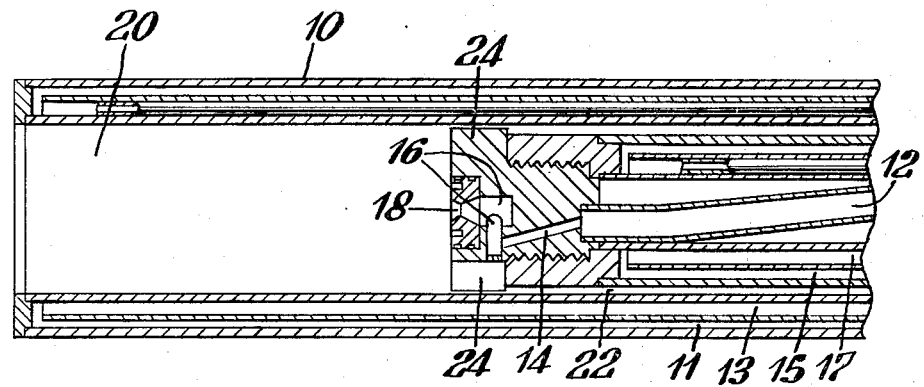
FIG. 1 is a longitudinal cross-sectional view of a burner head suitable for carrying out the method of the invention.

Referring to FIG. 1, there is shown a throat combustion burner 10 suitable for carrying out the method of the invention. The burner 10 comprises a plurality of pipe sections providing passages for the fuel-additive mixture, oxygen and a coolant fluid. More specifically, a central inlet passage 12 is provided for receiving the fuel-additive mixture into the burner 10. Central passage 12 communicates through a passage 14 with a swirl chamber 16. An orifice 18 is provided at the front end of the chamber 16 for feeding the fuel-additive mixture into a throat 20 of the burner 10. An oxygen inlet passage 22 communicates through a series of vanes 24 with the burner throat 20. A plurality of annular passages 11, 13, 15, and 17 are provided for the flow of a coolant fluid. Fuel-additive mixture introduced into central inlet passage 12 enters the swirl chamber 16 and is atomized as it leaves orifice 18. The atomized fuel-additive mixture enters the burner throat 20 where combustion of the fuel-additive mixture occurs. While the burner 10 shown in FIG. 1 is of the throat combustion type, it is to be understood that other types of burner providing adequate contact between a flame and an additive to produce the molten product of combustion can be employed in carrying out the method of the invention.

Figure 2:
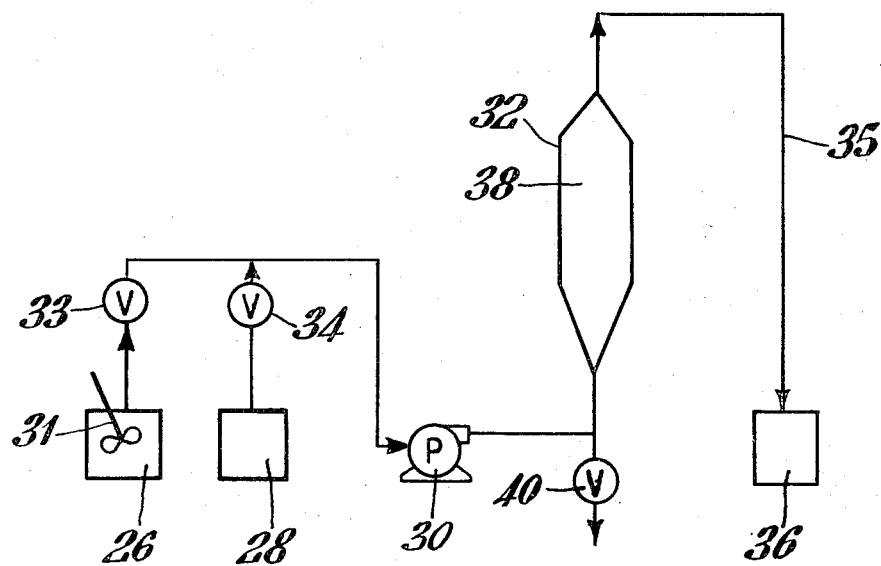
FIG. 2 is a flow diagram of an apparatus suitable for preparing a suspensoid mixture of a powdered solid additive in a liquid fuel for combustion in the burner shown in FIG. 1.

Referring to FIG. 2, there is shown diagrammatically the apparatus for preparing a mixture of a powdered solid additive, such as calcium carbide, in a liquid fuel, such as kerosene. The purpose of operation in this apparatus is to remove rough particles from the slurry by sedimentation in order to prepare a suspension which assures a smooth operation of the burner.

A batch of slurry calcium carbide in kerosene, and a batch of pure kerosene are provided, respectively, in containers 26 and 28. The slurry is violently agitated in container 26 by an air driven impeller 31. The batch of the slurry is pumped to separator 32 by pump 30 through valve 33. Valve 33 is then closed and pure kerosene is pumped from storage container 28 through valve 34 into separator 32 then through line 35 into tank 36. All particles of $CaC_2$ which have sedimentation rates less than the linear velocity of the kerosene being pumped through the straight section 38 of separator 32 are washed over into tank 36. The undesirable large particles drop to the bottom of separator 32 and at the end of the separation cycle are removed through valve 40.

The suspension can be concentrated in tank 36 to any desired degree by removing kerosene from the tank 36 after the particles have settled out. For storage, the suspension can be concentrated to a thick slurry.

The desired particle size fraction of the powdered solid can be separated from oversized particles by any conventional dry or wet method. However, the wet method of separation described above is preferred for solids such as calcium carbide which have a reactivity with the atmosphere. Calcium carbide powder can be stored safely for a prolonged period of time as a slurry in oil.

A series of tests were conducted to determine the effect of a powdered solid additive mixed with a fuel on the efficiency of heat transfer between a flame and a metal and consequently, on the melting rate of the metal.

As an example of these tests, one inch diameter steel bars were melted axially with a stoichiometric "carbide flame" produced by combusting a 20% calcium carbide suspension in kerosene, at a firing rate of 700,000 b.t.u./hr. by directing the carbide flame against the upper end of the steel bars. In another part of this test, a pure kerosene flame, combusted with the stoichiometric amount of oxygen, was used to melt the steel bars at the same firing rate of 700,000 b.t.u./hr.

The steel bars were positioned vertically in a refractory lined container. The melting of the upper end of the bars was followed by advancing the burner downward as the melting progressed to maintain the firing distance constant. The firing distance is defined as the distance from the discharge end of the burner to the metal being melted. The melting rate of the steel bars was measured by recording the position of the burner as a function of time.

At a constant firing distance of 10 inches the stoichiometric carbide flame melted the steel bars at a rate of 295 gms./min. At the same firing distance, the stoichiometric kerosene flame melted the bars at a rate of 150 gms./min. Hence, the steel bars were melted almost twice as fast with the stoichiometric carbide flame as with the stoichiometric kerosene flame.

The molten metal was collected in a refractory trap built around the base of the steel bars. Total iron was determined by standard techniques. Metallic iron was measured by dissolving the steel sample in hydrochloric acid and collecting the hydrogen generated in the reaction. Analysis of the samples showed that 10% of the steel was oxidized by the stoichiometric carbide flame, while 45% was oxidized by the kerosene flame. These test results are summarized in the Table I below.

TABLE I

|  | Melting rate, gms./min. | Percent oxidation |
| --- | --- | --- |
| Stoichiometric carbide flame (20% $CaC_2$) | 95 | 10 |
| Stoichiometric kerosene flame | 150 | 45 |

As shown above, the results demonstrate that, at the same firing rate, a much faster melting rate can be obtained with the carbide flame than with the kerosene flame, and that the amount of oxidation taking place was only 10% with the carbide flame, while there was 45% oxidation with the kerosene flame. Thus, the results show that the presence of the carbide in the flame improves both heat transfer from the flame to a solid steel target material and at the same time reduces oxidation of the metal.

In another series of tests, heat transfer efficiencies were measured by firing the burner against water in a 100-gallon capacity calorimeter. The liquid fuel-solid additive mixtures shown in Table II were tested.

TABLE II

Fuel Mixture A: 20% lime+16% $CaC_2$+64% kerosene
Fuel Mixture B: 20% $CaC_2$+80% kerosene
Fuel C: Pure kerosene.

Oxygen and fuel flow rates were adjusted to obtain the same firing rate of 700,000 B.t.u./hr. for each mixture. At a firing distance of 16-in. the heat transfer efficiencies measured were 87% for Fuel Mixture A, 80% for Fuel Mixture B, and 71% for Fuel C. The results of these tests show that the presence of calcium carbide and of lime in the flame improves heat transfer efficiency from the flame as compared to the pure kerosene flame.

The advantages of using the invention for providing a method of heating scrap at a high rate and without excessive oxidation of the scrap in the basic oxygen furnace, was demonstrated by tests conducted in a 500-lb. capacity furnace. One test demonstrated basic oxygen furnace operation with a 50% scrap charge. The scrap charge consisted of 250-lb. electrolytic iron which was charged on top of 5-lb. coke and 4-lb. lime in a hot converter. The ignited burner was lowered into the converter to approximately 5 inches above the top of the scrap pile. After 1½ minutes, the burner was lowered to follow the melting of the scrap and to maintain the 5 inch firing distance. The fuel mixture consisting of 5.2% lime, 14.8% calcium carbide, and 80% fuel oil was fed by a slurry pump into the burner. The mixture was combusted with pure oxygen. After about 9 minutes the burner was lifted from the converter to charge 10 lbs. lime and 250 lbs. molten pig ion into the furnace. Then the refining period was started by lowering the burner and operating it as a refining lance. Refining was interrupted after about 7 minutes to take slag and metal samples and to measure bath temperature.

One significant result of this test was to prove that the molten pig iron could be tapped onto the preheated molten scrap without causing a violent reaction, indicating that excessive oxidation of the metal was successfully prevented during the fast melting period. An excess of iron oxide would have reacted violently with the molten pig iron. The fact that oxidation of the molten scrap was also prevented was also shown by the low iron oxide content of the slag, the composition of which is given below in Table III:

TABLE III

| Slag analysis: | Percent |
|---|---|
| CaO | 32.1 |
| MgO | 17.2 |
| MnO | 4.9 |
| $SiO_2$ | 27.6 |
| FeO | 8.4 |
| $Fe_2O_3$ | 9.7 |
| Undetermined | 0.1 |

The iron content of the slag was less than in conventional oxygen practice, that is, when steel is produced in the basic oxygen furnace from a charge containing about 30% scrap.

The results of these tests show that the invention provides an efficient method for heating and melting scrap in a basic oxygen furnace in excess of the normal scrap charge, at a high rate and without oxidizing excessive amounts of iron. Although the above tests were conducted in a basic oxygen furnace, the invention may be carried out in other types of furnaces and flame heating applications, for example, in a scrap melting shaft furnace.

While the tests were performed with the oxide and carbide of calcium as the powdered solid additive, other additives, such as the inert additives $Cr_2O_3$, $Fe_2O_3$, and the combustible additives comprising metal carbides, ferro-alloys or metals, such as SiC, $Fe_3C$, FeSi, CaSi, Ni and Cr can also be employed. The choice of the particular additive as well as the concentration of the additive in the fuel oil, depends on the end result desired of the process. It is to be noted that the additive is not used primarily for its heating value. The purpose of the additive is to improve the utilization of the heating value of an inexpensive fuel, to increase the heat by allowing a stoichiometric or near stoichiometric combustion of the fuel with oxygen without causing excessive oxidation of the metal.

A particular advantage of the method for the basic oxygen furnace is that it provides a high heating and melting rate of the scrap without excessive oxidation of iron and results in a smaller heat and gas load on the waste gas equipment than conventional flames. An additional advantage of using lime and/or calcium carbide as an additive in basic oxygen furnace application of the invention is that the flame supplies lime in molten and finely divided form into the furnace charge.

What is claimed is:

1. In a method of melting metal with an oxy-fuel flame, the improvement comprising increasing the melting rate of the metal while simultaneously preventing excessive oxidation of the metal by the steps of:
    (1) providing a mixture of a liquid fuel and a solid powdered additive selected from the group consisting of lime, calcium carbide and mixtures thereof;
    (2) feeding said fuel-additive mixture into a confined zone of a fluid-cooled burner under fluid pressure and providing it therein with a swirling motion;
    (3) discharging the fuel-additive mixture from said confined zone into an enlarged confined combustion zone of said burner through an atomizing orifice;
    (4) combusting said fuel-additive mixture with oxygen in said combustion zone thereby causing a flame; and
    (5) impinging said flame containing the additive against the surface of the metal thereby melting the metal while simultaneously preventing excessive oxidation thereof.

2. The method of claim 1, wherein the fuel is a hydrocarbon oil.

3. The method of claim 2, wherein the solid powdered additive is calcium carbide.

4. The method of claim 2, wherein the solid powdered additive is lime.

5. The method of claim 2, wherein the metal being melted is a ferrous metal.

6. The method of claim 5, wherein the solid powdered additive is a mixture of calcium carbide and lime.

7. The method of claim 5, wherein the ferrous metal being melted comprises scrap metal in a basic oxygen furnace.

8. The method of claim 7, wherein the solid powdered additive is calcium carbide.

9. The method of claim 5, wherein the ferrous metal being melted comprises scrap metal in a shaft furnace.

10. The method of claim 9, wherein the solid powdered additive is calcium carbide.

References Cited

UNITED STATES PATENTS

| 3,556,773 | 1/1971 | Grenfell | 75—52 |
|---|---|---|---|
| 2,669,511 | 2/1954 | Whitney | 75—43 |
| 2,938,782 | 5/1960 | Toulmin | 75—41 |
| 3,366,469 | 1/1968 | Kodama et al. | 75—42 |
| 3,350,196 | 10/1967 | Bashford | 75—52 |
| 3,317,309 | 5/1967 | Rinesch | 75—43 |
| 3,418,108 | 12/1968 | Von Stroh | 75—43 |
| 2,800,172 | 7/1957 | Romer et al. | 75—42 UX |
| 3,460,934 | 8/1969 | Kelmar | 75—42 X |
| 3,547,624 | 12/1970 | Gray | 75—43 X |

FOREIGN PATENTS

| 1,125,276 | 8/1968 | Great Britain. | |
|---|---|---|---|
| 951,429 | 3/1964 | Great Britain | 75—60 |
| 952,507 | 3/1964 | Great Britain | 75—60 |
| 970,858 | 9/1964 | Great Britain | 75—60 |
| 1,109,420 | 4/1968 | Great Britain | 75—60 |
| 234,295 | 6/1961 | Australia | 75—43 |
| 670,602 | 1/1966 | Belgium | 75—43 |

L. DEWAYNE RUTLEDGE, Primary Examiner

M. J. ANDREWS, Assistant Examiner

U.S. Cl. X.R.

75—44 S, 60, 65, 68, 72

UNITED STATES PATENT OFFICE
CERTIFICATE OF CORRECTION

Patent No. 3,846,119        Issue Date  November 5, 1974

Inventor(s)    F.S. Death et al.

It is certified that error appears in the above-identified patent and that said Letters Patent are hereby corrected as shown below:

In column 2, line 52, replace "FeO$_3$" by -- Fe$_2$O$_3$ --.

In Table I, column 4, replace "95" by -- 295 --.

Signed and sealed this 24th day of June 1975.

(SEAL)
Attest:

RUTH C. MASON
Attesting Officer

C. MARSHALL DANN
Commissioner of Patents
and Trademarks